United States Patent
Bechir et al.

(10) Patent No.: US 12,281,417 B2
(45) Date of Patent: Apr. 22, 2025

(54) SELF-WRAPPING WOVEN SLEEVE WITH WEAR INDICATOR YARNS AND METHOD OF CONSTRUCTION THEREOF

(71) Applicant: FEDERAL-MOGUL POWERTRAIN LLC, Northville, MI (US)

(72) Inventors: Nizar Bechir, Ivors (FR); Amal Hmila, Crepy en Valois (FR)

(73) Assignee: Federal-Mogul Powertrain LLC, Northville, MI (US)

( * ) Notice: Subject to any disclaimer, the term of this patent is extended or adjusted under 35 U.S.C. 154(b) by 77 days.

(21) Appl. No.: 18/101,368

(22) Filed: Jan. 25, 2023

(65) Prior Publication Data
US 2023/0235490 A1  Jul. 27, 2023

Related U.S. Application Data

(60) Provisional application No. 63/303,450, filed on Jan. 26, 2022.

(51) Int. Cl.
*H02G 3/04* (2006.01)
*D02G 3/36* (2006.01)
(Continued)

(52) U.S. Cl.
CPC .............. *D03D 1/0043* (2021.05); *D02G 3/36* (2013.01); *D03D 3/02* (2013.01); *D03D 15/47* (2021.01);
(Continued)

(58) Field of Classification Search
CPC ........ D03D 1/0043; D03D 3/02; D03D 15/47; D03D 15/54; D03D 15/283; D03D 15/292;
(Continued)

(56) References Cited

U.S. PATENT DOCUMENTS 5,685,014 A * 11/1997 Dapsalmon ...... A41D 19/01511
2/167
6,265,039 B1 * 7/2001 Drinkwater ............. F16L 47/22
428/36.1
(Continued)

FOREIGN PATENT DOCUMENTS

DE    69605150 T2    5/2000
DE    69717442 T2    9/2003
(Continued)

OTHER PUBLICATIONS

International Search Report, mailed May 15, 2023 (PCT/US2023/061323).

*Primary Examiner* — Robert H Muromoto, Jr.
(74) *Attorney, Agent, or Firm* — John D. Wright; Dickinson Wright PLLC

(57) ABSTRACT

A woven sleeve for routing and protecting an elongate member includes a wall having opposite edges extending lengthwise in generally parallel relation with a longitudinal central axis between opposite ends. The wall includes warp yarns extending lengthwise between the opposite ends and weft yarns extending circumferentially about the longitudinal central axis. At least some of the weft yarns are provided as bi-component yarns having a central core of heat-set material that biases the opposite edges into overlapping relation with one another, with an outer sheath encircling the central core. The central core and the outer sheath are different colors from one another, such that upon a portion of the outer sheath being split or worn, the central core becomes discernably visible.

17 Claims, 2 Drawing Sheets

(51) Int. Cl.
  *D03D 1/00* (2006.01)
  *D03D 3/02* (2006.01)
  *D03D 15/47* (2021.01)
  *D03D 15/54* (2021.01)

(52) U.S. Cl.
  CPC .......... *D03D 15/54* (2021.01); *H02G 3/0406* (2013.01); *H02G 3/0462* (2013.01); *D10B 2401/20* (2013.01)

(58) Field of Classification Search
  CPC ...... D03D 15/567; D03D 1/0041; D02G 3/36; D02G 3/44; H02G 3/0406; H02G 3/0462; H02G 3/0481; D10B 2401/20; D10B 2101/06; D10B 2331/021; D10B 2331/04; D10B 2331/301; D10B 2401/041; D10B 2401/046; D10B 2401/14; D10B 2505/00
  See application file for complete search history.

(56) References Cited

U.S. PATENT DOCUMENTS

| | | | | |
|---|---|---|---|---|
| 9,277,684 | B2* | 3/2016 | Laurent | D03D 1/0043 |
| 9,913,415 | B2* | 3/2018 | Harris | H05K 9/009 |
| 10,132,012 | B2* | 11/2018 | Thomas | D03D 15/587 |
| 10,357,933 | B2* | 7/2019 | Malloy | H02G 3/0412 |
| 10,615,581 | B2* | 4/2020 | Knudson | H05K 9/009 |
| 10,808,355 | B2* | 10/2020 | Baldinger | D07B 1/02 |
| 11,268,217 | B2* | 3/2022 | Woodruff | D03D 15/47 |
| 11,332,856 | B2* | 5/2022 | Malloy | D03D 3/005 |
| 11,370,179 | B2* | 6/2022 | Fukuyama | B29C 65/4815 |
| 11,384,457 | B2* | 7/2022 | Malloy | D03D 1/0043 |
| 11,434,590 | B2* | 9/2022 | Harris | D04C 1/06 |
| 11,920,266 | B2* | 3/2024 | Qiu | D03D 1/0043 |
| 2004/0266296 | A1* | 12/2004 | Martinsson | D03D 15/54 442/195 |
| 2012/0037263 | A1* | 2/2012 | Malloy | D03D 15/00 28/165 |
| 2014/0090739 | A1* | 4/2014 | Harris | D03D 15/49 139/35 |
| 2014/0262476 | A1* | 9/2014 | Laurent | H05K 9/0007 174/379 |
| 2014/0262478 | A1* | 9/2014 | Harris | D03D 15/567 139/420 R |
| 2015/0083268 | A1* | 3/2015 | Itoh | D06C 7/02 28/165 |
| 2015/0337465 | A1* | 11/2015 | Woodruff | D03D 13/004 28/142 |
| 2016/0358690 | A1* | 12/2016 | Liu | D03D 1/0058 |
| 2017/0175304 | A1* | 6/2017 | Woodruff | H01B 7/0045 |
| 2018/0287357 | A1* | 10/2018 | Knudson | H02G 3/0481 |
| 2019/0375181 | A1* | 12/2019 | Malloy | D03D 3/02 |
| 2022/0154371 | A1* | 5/2022 | Woodruff | D03D 15/283 428/36.1 |
| 2022/0290339 | A1* | 9/2022 | Qiu | D03D 3/02 |
| 2023/0235490 | A1* | 7/2023 | Bechir | H02G 3/0462 139/388 |

FOREIGN PATENT DOCUMENTS

| | | | | |
|---|---|---|---|---|
| JP | 2003112876 A | * | 4/2003 | ............ B66B 7/1223 |
| JP | 3831446 B2 | * | 10/2006 | ................. D01F 8/14 |
| NZ | 544352 A | * | 3/2009 | ............ D02G 3/346 |
| WO | 9854393 A1 | | 12/1998 | |

* cited by examiner

SELF-WRAPPING WOVEN SLEEVE WITH WEAR INDICATOR YARNS AND METHOD OF CONSTRUCTION THEREOF

CROSS-REFERENCE TO RELATED APPLICATION

This application claims the benefit of U.S. Provisional Application Ser. No. 63/303,450, filed Jan. 26, 2022, which is incorporated herein by reference in its entirety.

BACKGROUND OF THE INVENTION

1. Technical Field

This invention relates generally to woven sleeves for protecting elongate members, and more particularly to self-wrapping woven sleeves.

2. Related Art

It is known to contain and protect elongate members, such as wires and wire harnesses, for example, in protective woven sleeves, such as in automobiles, aircraft or aerospace craft, to provide protection to the wires against abrasion, fluid and thermal affects. In order to provide the desired protection to the elongate members, the physical integrity of the woven fabric of forming a wall of the sleeve must not be compromised. Although woven sleeves generally provide suitable protection to an elongate member, such as a wire harness, conduit or the like, being protected within a central cavity of the woven sleeve, the desired protection can be diminished when the woven fabric becomes damage, such as by being abraded. If one or more of the yarns of the woven fabric become abraded, the entire structure of the woven fabric can ultimately be compromised, particularly if the abraded yarn(s) break. When the structure of the woven fabric becomes compromised, the level of protection to the elongate member is diminished, and thus, the intended function of the elongate member can be compromised. Accordingly, it is desired to know when the structural integrity of the woven sleeve is becoming comprised to allow proper maintenance to be performed to the sleeve prior to the intended function of the elongate member being compromised.

SUMMARY OF THE INVENTION

One aspect of the invention provides a woven sleeve having one or more indicator yarns that indicate the presence of wear prior to the structural integrity of the woven sleeve being compromised to a degree that would otherwise diminish the intended performance of the elongate member.

Another aspect of the invention provides the one or more indicator yarns being heat-set to bias opposite edges of a woven wall of the sleeve into overlying relation with one another to circumferentially bound a central cavity of the woven sleeve to prevent the ingress of contamination into the central cavity of the sleeve.

Another aspect of the invention provides the one or more indicator yarns to change color in regions becoming compromised to provide advance indication that it is time to replace the woven sleeve to avoid the level of protection desired by the woven sleeve from being compromised to a degree that would otherwise diminish the intended performance of the elongate member.

In accordance with these and other aspects of the invention, a woven sleeve having an elongate wall configured to bound a cavity extending a longitudinal central axis of the sleeve for routing and protecting an elongate member within the cavity is provided. The wall has opposite edges extending lengthwise in generally parallel relation with one another between the opposite ends. The wall includes warp yarns extending generally parallel to the opposite edges and weft yarns extending generally transversely to the warp yarns. At least some of the weft yarns are formed from a heat-settable material such that upon being heat-set, the opposite edges are biased into overlapping relation with one another to circumferentially bound the cavity. At least some of the warp yarns and/or weft yarns include bi-component yarns having a central core and an outer sheath encircling and encapsulating the central core. The central core and the outer sheath are different colors from one another, such that upon the outer sheath being split or worn, the central core becomes discernably visible.

In accordance with another aspect of the invention, at least some of the weft yarns can be provided as the bi-component yarns, with the weft bi-component yarns having at least one of the central core and outer sheath as the heat-settable material.

In accordance with another aspect of the invention, at least some of the weft yarns can be provided as the bi-component yarns, with the weft bi-component yarns having the central core as the heat-settable material.

In accordance with another aspect of the invention, the entirety of the weft yarns can be provided as the bi-component yarns.

In accordance with another aspect of the invention, the entirety of the warp yarns can be provided as the bi-component yarns.

In accordance with another aspect of the invention, the entirety of the weft yarns and warp yarns can be provided as the bi-component yarns, with at least some of the weft bi-component yarns having the central core as the heat-settable material.

In accordance with another aspect of the invention, a thickness of the outer sheath of the bi-component yarns can be provided having a predetermined thickness such that upon the central core being exposed, sufficient protection is provided to the elongate member by the central core to allow unimpeded performance by the elongate member, thus allowing time to replace the woven sleeve without compromised performance of the elongate member.

In accordance with another aspect of the invention, the outer sheath is provided having a maximum first outer diameter and the central core is provided having a maximum second outer diameter, wherein the maximum second outer diameter is between 5 to 95 percent of the maximum first outer diameter.

In accordance with another aspect of the invention, the outer sheath is provided having a maximum first outer diameter and the central core is provided having a maximum second outer diameter, wherein the maximum second outer diameter is between 50 to 80 percent of the maximum first outer diameter.

In accordance with another aspect of the invention, a woven sleeve for routing and protecting an elongate member includes a wall having opposite edges extending lengthwise in generally parallel relation with a longitudinal central axis between opposite ends. The wall includes warp yarns extending lengthwise between the opposite ends and weft yarns extending circumferentially about the longitudinal central axis. At least some of the weft yarns are formed from bi-component yarns having a central core of heat-set material that biases the opposite edges into overlapping relation with one another and an outer sheath encircling the central core, wherein the central core and the outer sheath are different colors from one another, such that upon a portion of the outer sheath being split or worn, the central core becomes discernably visible, thereby indicating it is time to repair or replace the woven sleeve.

In accordance with another aspect of the invention, a woven sleeve for routing and protecting an elongate member includes a wall having opposite edges extending lengthwise in generally parallel relation with a longitudinal central axis between opposite ends. The wall includes warp yarns extending lengthwise between the opposite ends and weft yarns extending circumferentially about the longitudinal central axis. At least some of the weft yarns are formed from bi-component yarns having a central core of heat-set material that biases the opposite edges into overlapping relation with one another and an outer sheath encircling the central core, wherein the central core and the outer sheath are different colors from one another, such that upon a portion of the outer sheath being split or worn, the central core becomes discernably visible.

In accordance with another aspect of the invention, a method of constructing a protective sleeve is provided. The method includes weaving an elongate wall having opposite edges extending lengthwise in generally parallel relation with one another between the opposite ends and heat-setting the wall to bias the opposite edges into overlapping relation with one another to bound a cavity extending a longitudinal central axis of the sleeve for routing and protecting an elongate member within the cavity. The method further includes weaving wall including warp yarns extending generally parallel to the opposite edges and weft yarns extending generally transversely to the warp yarns and providing at least some of the weft yarns being formed from a heat-settable material such that upon being heat-set, the opposite edges are biased into overlapping relation with one another to circumferentially bound the cavity. The method further includes providing at least some of the warp yarns and/or weft yarns as bi-component yarns having a central core and an outer sheath encircling and encapsulating the central core, wherein central core and the outer sheath are different colors from one another, such that upon the outer sheath being split or worn, the central core becomes discernably visible.

In accordance with another aspect of the invention, the method can further include providing the entirety of the weft yarns including the bi-component yarns.

In accordance with another aspect of the invention, the method can further include providing at least some of the warp yarns including the bi-component yarns.

In accordance with another aspect of the invention, the method can further include providing the outer sheath having a maximum first outer diameter and providing the central core having a maximum second outer diameter, wherein the maximum second outer diameter is between 5 to 95 percent of the maximum first outer diameter.

In accordance with another aspect of the invention, the method can further include providing the maximum second outer diameter being between 20 to 40 percent of the maximum first outer diameter.

In accordance with another aspect of the invention, a method of visually indicating when a protective self-wrapping sleeve, woven with warp and weft yarns, wrapped about an elongate member to be protected needs to be changed prior to the elongate member being compromised is provided. The method includes providing at least some of the warp yarns and/or weft yarns as bi-component yarns having a central core and an outer sheath encircling and encapsulating the central core, wherein central core and the outer sheath are different colors from one another, such that upon the outer sheath being split or worn, the central core becomes discernably visible, thereby indicating it is time to replace the protective self-wrapping sleeve.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
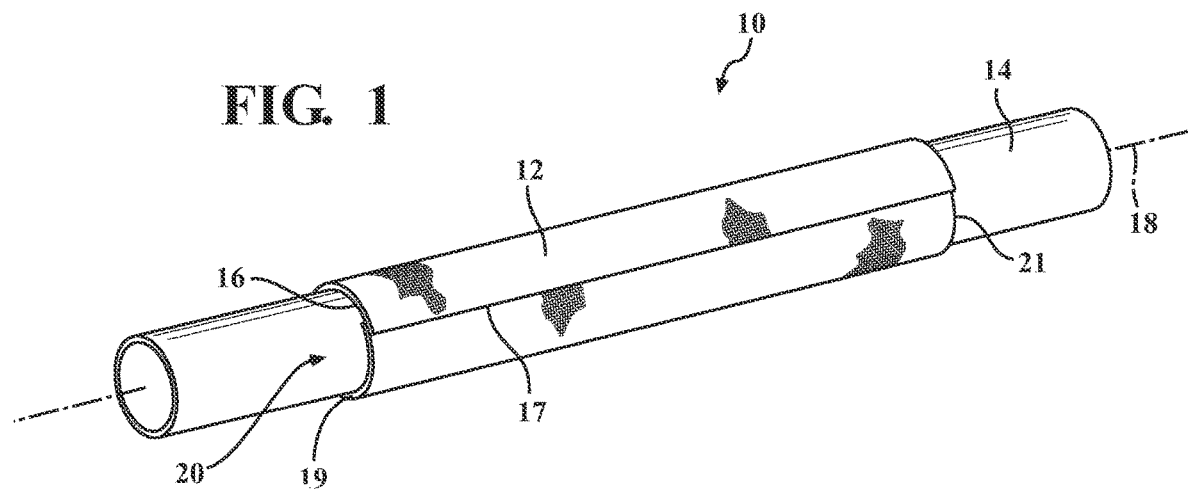
FIG. 1 is schematic perspective view of a woven, self-wrapping sleeve constructed in accordance with one aspect of the invention, with the sleeve shown wrapped about and protecting an elongate member therein.
Figure 2:
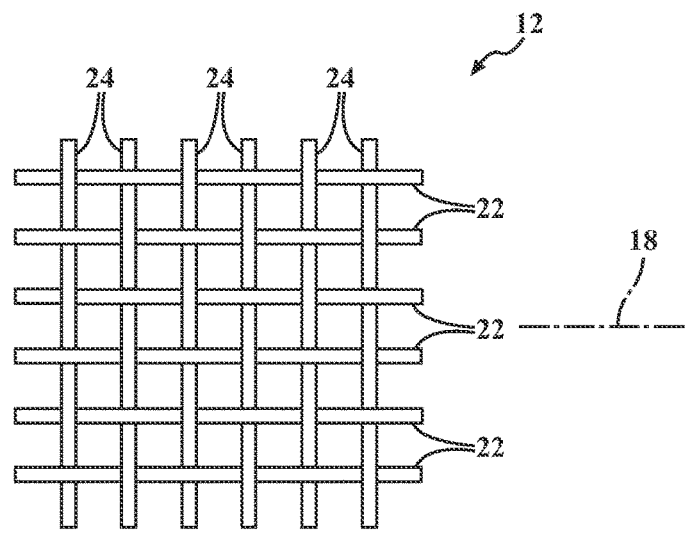
FIG. 2 is an enlarged schematic fragmentary view of a woven wall of the woven, self-wrapping sleeve of FIG. 1.

Referring in more detail to the drawings, FIG. 1 shows schematic representation of a self-wrapping woven sleeve, referred to hereafter as sleeve 10, constructed in accordance with one aspect of the invention. The sleeve 10 has a self-wrapping elongate wall, referred to hereafter as wall 12, for routing and protecting an elongate member(s), such as a fluid conduit, gas conduit, wires or a wire harness 14, for example, from exposure to abrasion and the ingress of contamination, debris and the like. The wall 12 has opposite, lengthwise extending edges 16, 17 extending generally parallel to a longitudinal central axis 18 between opposite ends 19, 21. The edges 16, 17 are biased into overlapping relation with one another in "cigarette wrapped" fashion to fully enclose the elongate member 14 within a central cavity 20 of the sleeve 10. The bias imparted by the wall 12 is what causes the wall 12 to be "self-wrapping." Accordingly, while in a relax state, the opposite edges 16, 17 are biased into overlapping relation with one another. The cavity 20 extends along the longitudinal central axis 18 and is readily accessible along the full length of the wall 12, via manual separation of the opposite edges 16, 17 away from one another under an applied force sufficient to separate the opposite edges 16, 17 against the bias imparted by the wall 12. As such, the elongate member(s) 14 can be readily disposed radially, relative the axis 18, into the cavity 20, and conversely, removed from the cavity 20, such as during service.

Figure 4:
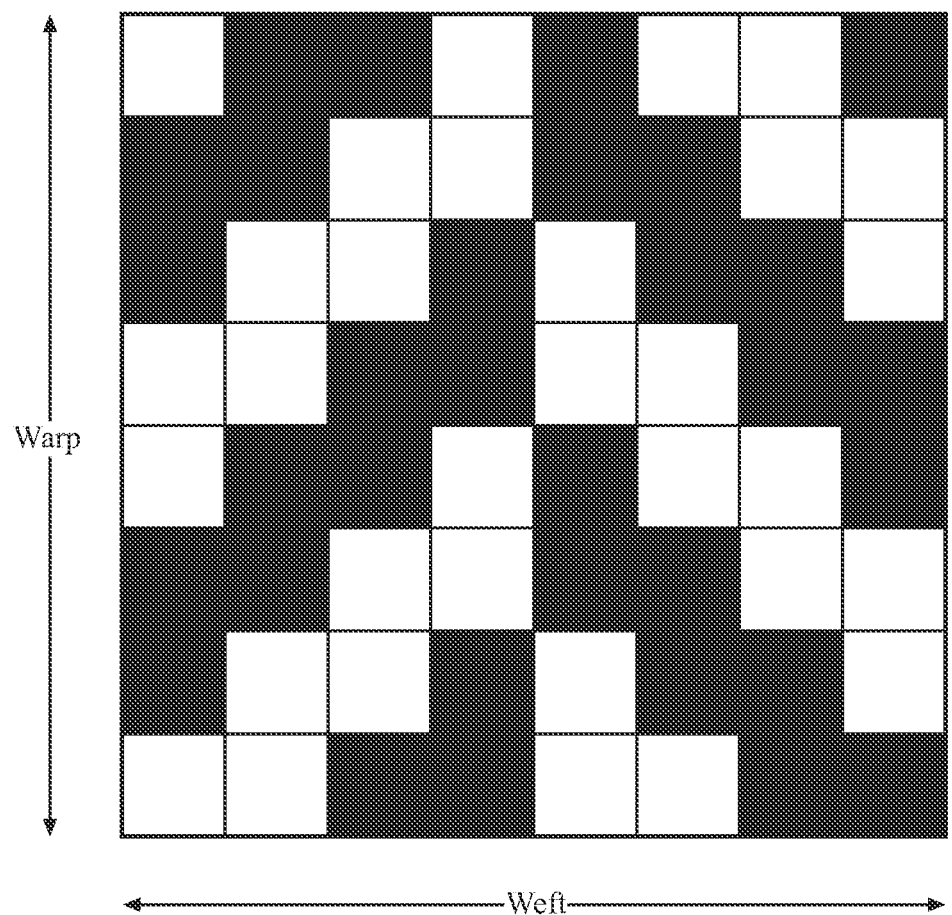
FIG. 4 is a weave diagram of a woven sleeve constructed in accordance with an aspect of the disclosure.

The wall 12 is woven with warp yarns 22 extending generally parallel to the central longitudinal axis 18 and fill yarns, also commonly referred to as weft yarns 24, extending generally circumferentially about the wrapped wall 12 in generally transverse relation to the warp yarns 22. At least some or all of the weft yarns 24 are provided as heat-settable yarns, such that upon heat-setting the fill yarns 24 to a heat-set state while in a curled, wrapped configuration, the wall 12 is biased to self-curl under a bias imparted by the heat-set fill yarns 24, also referred to as self-wrap, such that the opposite edges 16, 17 are biased into overlapping relation with one another. The bias is imparted by the heat-set weft yarns 24 into their curled configuration about the central longitudinal axis 18, thereby rendering the wall 12 self-curling, also referred to as self-wrapping. In accordance with a non-limiting embodiment, the wall 12 can be woven with a weave pattern shown in FIG. 4, though it is to be recognized that any suitable weave pattern could be used, depending on the requirement of the application.

Depending on the application needs, the wall 12 can be constructed having any suitable size, including length and diameter. When the wall 12 is in its self-wrapped tubular configuration, generally free from any externally applied forces, the edges 16, 17 preferably overlap one another in self-biased fashion at least slightly to fully enclose the central cavity 20, and thus, provide enhanced protection to the elongate member(s) 14 contained in the cavity 20. The edges 16, 17 are readily extendable away from one another under a manually applied external force sufficient to overcome the shape memory bias heat-set into the weft yarns 24 to at least partially open and expose the cavity 20. Accordingly, the elongate member(s) 14 can be readily disposed into the cavity 20 during assembly or removed from the cavity 20 during service. Upon releasing the manually applied external force, the opposite edges 16, 17 return automatically to their curled shape via the heat-set bias, thereby bringing the opposite edges 16, 17 into overlapping relation with one another under the bias imparted by the heat-set weft yarns 24.

The warp yarns 22 can be provided including any suitable monofilament and/or multifilament material. As such, the warp yarns 22 can be provided entirely as monofilaments; entirely as multifilaments, or as both monofilaments and multifilaments, if desired. Multifilaments are used to increased the "coverage" protection and to enhance flexibility, when desired. Coverage protection is enhance with multifilaments due to the ability of individual filaments of the multifilaments to spread and conform with adjacent yarns, thereby occupying an increased surface area relative to monofilament yarns. The warp yarns 22 can be provided of any desired thermoplastic material, such as one or more of polyester, PPS, Nomex, by way of example and without limitation, and further can include inorganic material, such as one or more of fiberglass and basalt, by way of example and without limitation.

The weft yarns 24 can be provided including any suitable monofilament and/or multifilament material, including heat-settable monofilament and/or multifilament polymeric material. As such, the weft yarns 24 can be provided as both heat-settable monofilaments (though non-heat-settable monofilaments can be used) and high coverage multifilaments. To provide the wall 12 with increased self-wrapping capacity and increased optical coverage, to inhibit seeing through the wall 12 into the cavity 20, thereby enhancing protection against the ingress of contamination, the weft yarn 24 monofilaments and multifilaments can be woven in alternating fashion with one another along the length of the sleeve 10. The weft yarns 24 can be provided of any desired thermoplastic material, such as one or more of polyester, PPS, Nomex, by way of example and without limitation, and further can include inorganic material, such as one or more of fiberglass and basalt, by way of example and without limitation.

Figure 3A:
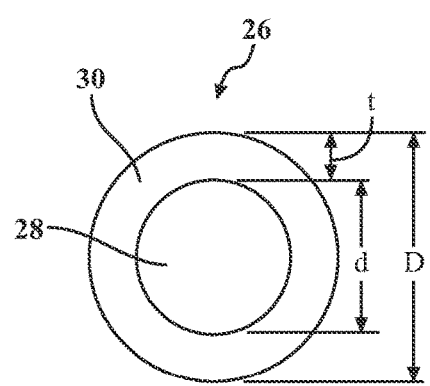
FIG. 3A is an end view of an indicator bi-component yarn constructed in accordance with a non-limiting embodiment of the invention shown in a non-worn state.
Figure 3B:
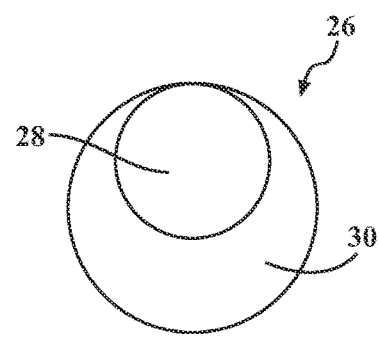
FIG. 3B is a view similar to FIG. 3A, with the indicator bi-component yarn shown in a worn state, wherein a central core of the bi-component yarn becomes discernably visible to indicate it is time to replace with worn self-wrapping sleeve.

At least some of the warp yarns 22 and/or weft yarns 24 include bi-component yarns 26 (FIG. 3A) having a central core 28 and an outer sheath 30 encircling and encapsulating the central core 28. The bi-component yarns 26 are considered herein as a monofilament (single filament), although having a central core/outer sheath construction. The central core 28 and the outer sheath 30 are different colors from one another, such that upon a portion of the outer sheath 30 being split or worn (FIG. 3B) through its thickness (t: FIG. 3A), the color of the central core 28 becomes discernably visible relative to the different color of the outer sheath 30, such as to an observer or imaging apparatus viewing an outer surface of the sleeve 10. Upon the central core 28 becoming visible as a result of being exposed, an indication is provided that it is time to replace the sleeve 10 prior to the functionality of the elongate member 14 being compromised. Although the outer sheath 30 has become worn and/or cracked sufficiently to expose the central core 28, the wall 12, as a result of the unworn core 28, is still able to provide the desired protection to the elongate member 14 to prevent damage to the elongate member 14 for a sufficient period of time to allow the sleeve 10 to be serviced and/or replaced. If the sleeve 10 is not serviced or replaced after the visual indication (exposed central core 28) originates, the potential for damage to the elongate member(s) 14 increases over time.

In accordance with an exemplary embodiment, at least some of the weft yarns 24 can be provided as the bi-component yarns 26. Further yet, the weft bi-component yarns 26 can be provided with the central core 28 formed from one color of heat-settable material, and preferably a bright, easy to visualized color, while the outer sheath 30 is formed from a different color material. The central core 28 and the outer sheath 30 can be formed of the same material or different materials. In accordance with a non-limiting embodiment, the central core 28 is formed with a heat-settable material, such as polyethylene, and the outer sheath is formed of an abrasion resistant material, such as polyamide, though it is contemplated that the central core 28 and the outer sheath 30 can be formed of the same heat-settable material. However, it is contemplated that the central core 28 could be formed of a non-heat-settable material, with the outer sheath 30 being formed of the heat-settable material. In accordance with another exemplary embodiment, the entirety of the weft yarns 24 can be provided as the bi-component yarns 26, wherein at least some or all of the bi-component yarns 26 can include a heat-settable central core 28. In accordance with yet another exemplary embodiment, the entirety of the warp yarns 22 can be provided as the bi-component yarns 26, with the central core 28 being formed having a first color material and the outer sheath 30 being formed of a different second color material. Accordingly, in view of the above, the entirety of the weft yarns 24 and the entirety of the warp yarns 22 can be provided as the bi-component yarns 26, with at least some of the weft bi-component yarns 26 having the central core 28 as the heat-settable material to facilitate forming the sleeve 10 having its self-wrapping configuration.

In accordance with another aspect, the thickness (t) of the outer sheath 30 of the bi-component yarns 26 is provided having a predetermined thickness such that upon the central core 28 being exposed, sufficient protection is provided by the woven sleeve 10 without immediate concern for damage to the elongate member 14. Accordingly, although the central core 28 is exposed, uncompromised performance of the elongate member(s) 14 is maintained by the sleeve 10 for a period of time (the period of time is generally dependent on the harness of the surrounding atmosphere, but in any case, a typical application could allow weeks or months for the sleeve 10 to be serviced and/or replaced without jeopardizing the useful performance of the elongate member(s)). The outer sheath 30 is provided having a maximum first outer diameter (D) and the central core 28 is provided having a maximum second outer diameter (d), wherein the maximum second outer diameter (d) is between 5 to 95 percent of the maximum first outer diameter (D). Accordingly, the outer sheath thickness (t) can range between 2½ to 47½ percent of the maximum outer diameter (D). In one exemplary embodiment, the maximum second outer diameter (d) is between 20 to 40 percent of the maximum first outer diameter (D), such that the outer sheath thickness (t) ranges between 30 to 40 percent of the maximum first outer diameter (D), and in one non-limiting embodiment, the maximum second outer diameter (d) is about 30 percent of the maximum first outer diameter (D), such that the outer sheath thickness (t) is about 35 percent of the maximum first outer diameter (D).

In accordance with another aspect, a method of constructing a protective sleeve 10 is provided. The method includes: weaving an elongate wall 12 having opposite edges 16, 17 extending lengthwise in generally parallel relation with one another between opposite ends 19, 21 with warp yarns 22 extending generally parallel to the opposite edges 16, 17 and weft yarns 24 extending generally transversely to the warp yarns 22 and providing at least some of the weft yarns 24 being formed from a heat-settable material: heat-setting the wall 12 to bias the opposite edges 16, 17 into overlapping relation with one another to bound a cavity 20 extending a longitudinal central axis 18 of the sleeve 10, wherein at least some of the warp yarns 22 and/or weft yarns 24 are bi-component yarns having a central core 28 and an outer sheath 30 encircling and encapsulating the central core 28, wherein central core 28 and the outer sheath 30 are different colors from one another, such that upon the outer sheath 30 being split or worn (FIG. 3B), the central core 28 becomes discernably visible.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A woven sleeve for routing and protecting an elongate member, comprising:
a wall having opposite edges extending lengthwise in generally parallel relation with one another between opposite ends, said wall having warp yarns extending generally parallel to said opposite edges and weft yarns extending generally transversely to said warp yarns, at least some of said weft yarns being formed from a heat-settable material such that upon said heat-settable material being heat-set, said opposite edges are biased into overlapping relation with one another, and at least some of said warp yarns and/or said weft yarns including bi-component yarns having a central core and an outer sheath encircling said central core, wherein said central core and said outer sheath are different colors from one another, such that upon a portion of said outer sheath being split or worn, said central core becomes discernably visible, wherein the outer sheath is provided having a maximum first outer diameter and the central core is provided having a maximum second outer diameter, wherein the maximum second outer diameter is between 5 to 95 percent of the maximum first outer diameter.

2. The woven sleeve of claim 1, wherein at least some of the weft yarns are provided as the bi-component yarns, with the weft bi-component yarns having the central core as the heat-settable material.

3. The woven sleeve of claim 2, wherein the entirety of the weft yarns are provided as the bi-component yarns.

4. The woven sleeve of claim 2, wherein at least some of the warp yarns are provided as the bi-component yarns.

5. The woven sleeve of claim 4, wherein the entirety of the warp yarns are provided as the bi-component yarns.

6. The woven sleeve of claim 1, wherein at least some of the warp yarns are provided as the bi-component yarns.

7. The woven sleeve of claim 6, wherein the entirety of the warp yarns are provided as the bi-component yarns.

8. The woven sleeve of claim 1, wherein the entirety of the weft yarns and the warp yarns are provided as the bi-component yarns, with at least some of the weft bi-component yarns having the central core as the heat-settable material.

9. The woven sleeve of claim 1, wherein the maximum second outer diameter is between 20 to 40 percent of the maximum first outer diameter.

10. A woven sleeve for routing and protecting an elongate member, comprising:
a wall having opposite edges extending lengthwise in generally parallel relation with a longitudinal central axis between opposite ends, said wall having warp yarns extending lengthwise between said opposite ends and weft yarns extending circumferentially about said longitudinal central axis, at least some of said weft yarns being formed from bi-component yarns having a central core and an outer sheath, wherein at least one of said central core and outer sheath is formed of heat-set material that biases said opposite edges into overlapping relation with one another, wherein said central core and said outer sheath are different colors from one another, such that upon a portion of said outer sheath being split or worn, said central core becomes discernably visible, wherein said outer sheath is provided having a maximum first outer diameter and said central core is provided having a maximum second outer diameter, wherein said maximum second outer diameter is between 5 to 95 percent of said maximum first outer diameter.

11. The woven sleeve of claim 10, wherein the entirety of said weft yarns are provided as said bi-component yarns.

12. The woven sleeve of claim 10, wherein at least some of said warp yarns are provided as said bi-component yarns.

13. The woven sleeve of claim 10, wherein said maximum second outer diameter is between 20 to 40 percent of said maximum first outer diameter.

14. A method of constructing a protective sleeve, comprising:
weaving an elongate wall having opposite edges extending lengthwise in generally parallel relation with one another between opposite ends with warp yarns extending generally parallel to the opposite edges and weft yarns extending generally transversely to the warp yarns and providing at least some of the weft yarns being formed from a heat-settable material;

heat-setting the heat-settable material to bias the opposite edges into overlapping relation with one another to bound a cavity extending a longitudinal central axis of the sleeve between the opposite ends, wherein at least some of the warp yarns and/or weft yarns are bi-component yarns having a central core and an outer sheath encircling and encapsulating the central core, wherein central core and the outer sheath are different colors from one another, such that upon the outer sheath being split or worn, the central core becomes discernably visible, and further including providing the outer sheath having a maximum first outer diameter and providing the central core having a maximum second outer diameter, wherein the maximum second outer diameter is between 5 to 95 percent of the maximum first outer diameter.

15. The method of claim 14, further including providing the entirety of the weft yarns including the bi-component yarns.

16. The method of claim 14, further including providing at least some of the warp yarns including the bi-component yarns.

17. The method of claim 14, further including providing the maximum second outer diameter being between 20 to 40 percent of the maximum first outer diameter.

\* \* \* \* \*